(12) United States Patent
Tang et al.

(10) Patent No.: US 11,144,800 B2
(45) Date of Patent: Oct. 12, 2021

(54) IMAGE DISAMBIGUATION METHOD AND APPARATUS, STORAGE MEDIUM, AND ELECTRONIC DEVICE

(71) Applicant: BEIJING SENSETIME TECHNOLOGY DEVELOPMENT CO., LTD., Beijing (CN)

(72) Inventors: Xiaoou Tang, Beijing (CN); Yining Li, Beijing (CN); Chen Huang, Beijing (CN); Chen Change Loy, Beijing (CN)

(73) Assignee: BEIJING SENSETIME TECHNOLOGY DEVELOPMENT CO., LTD., Beijing (CN)

(*) Notice: Subject to any disclaimer, the term of this patent is extended or adjusted under 35 U.S.C. 154(b) by 202 days.

(21) Appl. No.: 16/663,303

(22) Filed: Oct. 24, 2019

(65) Prior Publication Data
US 2020/0057925 A1  Feb. 20, 2020

Related U.S. Application Data

(63) Continuation of application No. PCT/CN2018/084130, filed on Apr. 23, 2018.

(30) Foreign Application Priority Data

Apr. 25, 2017 (CN) .......................... 201710278676.0

(51) Int. Cl.
*G06K 9/20* (2006.01)
*G06K 9/72* (2006.01)
(Continued)

(52) U.S. Cl.
CPC ....... *G06K 9/726* (2013.01); *G06F 16/90332* (2019.01); *G06F 17/16* (2013.01);
(Continued)

(58) Field of Classification Search
CPC .... G06K 9/726; G06K 9/4604; G06K 9/6215; G06K 9/6271; G06K 9/6228;
(Continued)

(56) References Cited

U.S. PATENT DOCUMENTS

| 5,751,286 A * | 5/1998 | Barber ................. G06K 9/4647 715/835 |
| 8,429,168 B1 * | 4/2013 | Chechik ............... G06K 9/6276 707/741 |

(Continued)

FOREIGN PATENT DOCUMENTS

| CN | 1967526 A | 5/2007 |
| CN | 101751447 A | 6/2010 |

(Continued)

OTHER PUBLICATIONS

Tang Zhuangyuan. The Research for Image Tag Disambiguation in Collaborative Annotation System. Chinese Master's Theses Full-text Database. Jan. 15, 2013(Jan. 15, 2013), No. 1, chapters 3 and 4.

(Continued)

*Primary Examiner* — Mahendra R Patel
(74) *Attorney, Agent, or Firm* — Syncoda LLC; Feng Ma

(57) ABSTRACT

An image disambiguation method includes: performing image feature extraction and semantic recognition on at least two images in an image set including similar targets to obtain N K-dimensional semantic feature probability vectors, where the image set includes N images, N and K are both positive integers, and N is greater than or equal to 2; determining a differential feature combination according to the N K-dimensional semantic feature probability vectors, the differential feature combination indicating a difference between the similar targets in the at least two images in the image set; and generating a natural language for representing or prompting the difference between the similar targets (Continued)

in the at least two images in the image set according to the differential feature combination and image features of the at least two images in the image set.

20 Claims, 5 Drawing Sheets

(51) Int. Cl.
*G06F 16/9032* (2019.01)
*G06F 17/16* (2006.01)
*G06F 17/18* (2006.01)
*G06K 9/46* (2006.01)
*G06K 9/62* (2006.01)

(52) U.S. Cl.
CPC ........... *G06F 17/18* (2013.01); *G06K 9/4604* (2013.01); *G06K 9/6215* (2013.01)

(58) Field of Classification Search
CPC .............. G06K 9/00684; G06K 9/6256; G06K 9/6267; G06F 16/90332; G06F 17/16; G06F 17/18; G06F 16/583; G06F 16/5838; G06Q 30/02; H04N 21/44222
USPC .......................................................... 382/181
See application file for complete search history.

(56) References Cited

U.S. PATENT DOCUMENTS

| | | | | |
|---|---|---|---|---|
| 8,488,863 | B2* | 7/2013 | Boucheron | G06T 7/11 382/133 |
| 8,588,530 | B2* | 11/2013 | Jeson | H04N 5/23219 382/190 |
| 8,780,195 | B1* | 7/2014 | Rubin | G06K 9/6857 348/114 |
| 8,831,358 | B1* | 9/2014 | Song | G06K 9/46 382/218 |
| 8,873,812 | B2* | 10/2014 | Larlus-Larrondo | G06T 7/11 382/118 |
| 8,874,557 | B2* | 10/2014 | Lin | G06K 9/4676 707/723 |
| 8,880,563 | B2* | 11/2014 | Lin | G06F 16/5854 707/802 |
| 8,918,396 | B2* | 12/2014 | Nagano | G10L 17/26 707/737 |
| 9,280,562 | B1* | 3/2016 | Zhang | G06F 16/5838 |
| 9,342,758 | B2* | 5/2016 | Xue | G06K 9/6212 |
| 9,607,014 | B2* | 3/2017 | Wang | G06K 9/6263 |
| 9,710,888 | B2* | 7/2017 | Oakley | G06T 5/50 |
| 9,940,522 | B2* | 4/2018 | Wu | G06T 7/62 |
| 10,108,620 | B2* | 10/2018 | Zhao | G06K 9/00751 |
| 10,361,802 | B1* | 7/2019 | Hoffberg-Borghesani | G11B 27/11 |
| 10,515,110 | B2* | 12/2019 | Jing | G06F 16/538 |
| 2003/0128877 | A1* | 7/2003 | Nicponski | G06K 9/6269 382/224 |
| 2006/0155398 | A1* | 7/2006 | Hoffberg | G06K 9/00369 700/86 |
| 2011/0153362 | A1* | 6/2011 | Valin | G06Q 20/105 705/3 |
| 2015/0294191 | A1* | 10/2015 | Zhang | G06N 20/00 382/160 |
| 2017/0206437 | A1* | 7/2017 | Hachiya | G06K 9/6267 |
| 2017/0206465 | A1* | 7/2017 | Jin | G06N 20/00 |
| 2017/0329755 | A1* | 11/2017 | Liu | G06F 40/169 |

FOREIGN PATENT DOCUMENTS

| | | | | |
|---|---|---|---|---|
| CN | 103186538 | A | | 7/2013 |
| CN | 103268498 | A | * | 8/2013 |
| CN | 103607603 | A | * | 2/2014 |
| CN | 104484347 | A | * | 4/2015 |
| CN | 105930841 | A | | 9/2016 |
| CN | 106202583 | A | | 12/2016 |
| CN | 106227836 | A | | 12/2016 |
| GB | 2547068 | A | * | 8/2017 ............... G06N 3/08 |
| WO | WO-2016142285 | A1 | * | 9/2016 ............... G06F 16/50 |

OTHER PUBLICATIONS

International Search Report in the international application No. PCT/CN2018/084130. dated Jul. 27, 2018.
English translation of the Written Opinion of the International Search Authority in the international application No. PCT/CN2018/084130, dated Jul. 27, 2018.
First Office Action of the Chinese application No. 201710278676.0, dated Nov. 25, 2019.
Yining Li et al. "Learning to Disambiguate by Asking Discriminative Questions"; 2017 IEEE International Conference on Computer Vision; 2017, pp. 3439-3448.

* cited by examiner

IMAGE DISAMBIGUATION METHOD AND APPARATUS, STORAGE MEDIUM, AND ELECTRONIC DEVICE

CROSS-REFERENCE TO RELATED APPLICATIONS

This is a U.S. continuation application of International Application No. PCT/CN2018/084130 filed on Apr. 23, 2018, which claims priority to Chinese Patent Application No. CN 201710278676.0 filed on Apr. 25, 2017. The disclosures of these applications are hereby incorporated by reference in their entirety.

BACKGROUND

In recent years, with the popularization and development of artificial intelligence technologies, processing an image by using a computer is applied to more and more scenarios. Image disambiguation as an image processing means may provide a lot of convenience for users. For example, images including similar targets are processed to discriminate the similar targets in the images.

SUMMARY

The present disclosure relates to image processing technologies, and in particular, to an image disambiguation method and apparatus, a storage medium, and an electronic device.

Embodiments of the present disclosure provide solutions for image disambiguation.

According to one aspect of the embodiments of the present application, provided is an image disambiguation method, including: performing image feature extraction and semantic recognition on at least two images in an image set including similar targets to obtain N K-dimensional semantic feature probability vectors, where the image set includes N images, N and K are both positive integers, and N is greater than or equal to 2; determining a differential feature combination according to the N K-dimensional semantic feature probability vectors, where the differential feature combination indicates a difference between the similar targets in the at least two images in the image set; and generating a natural language used for representing or prompting the difference between the similar targets in the at least two images in the image set according to the differential feature combination and image features of the at least two images in the image set.

According to another aspect of the embodiments of the present disclosure, further provided is an image disambiguation apparatus, including: an extraction and recognition module configured to perform image feature extraction and semantic recognition on at least two images in an image set including similar targets to obtain N K-dimensional semantic feature probability vectors, where the image set includes N images, N and K are both positive integers, and N is greater than or equal to 2; a determination module configured to determine a differential feature combination according to the N K-dimensional semantic feature probability vectors, where the differential feature combination indicates a difference between the similar targets in the at least two images in the image set; and a generation module configured to generate a natural language used for representing or prompting the difference between the similar targets in the at least two images in the image set according to the differential feature combination and image features of the at least two images in the image set.

According to another aspect of the embodiments of the present disclosure, further provided is an electronic device, including a processor and a memory for storing instructions executable by the processor, where execution of the instructions by the processor causes the processor to perform corresponding operations of the image disambiguation method as described above.

According to another aspect of the embodiments of the present disclosure, further provided is an electronic device including the image disambiguation apparatus as described above.

According to another aspect of the embodiments of the present disclosure, provided is a computer program, including: a computer-readable code, where when the computer-readable code is run on a device, a processor in the device executes instructions for implementing the operations in the image disambiguation method according to any one of the embodiments of the present disclosure.

According to another aspect of the embodiments of the present disclosure, provided is a non-transitory computer-readable storage medium configured to store computer-readable instructions, where execution of the instructions by the processor causes the processor to perform the corresponding operations in the image disambiguation methods as described above.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
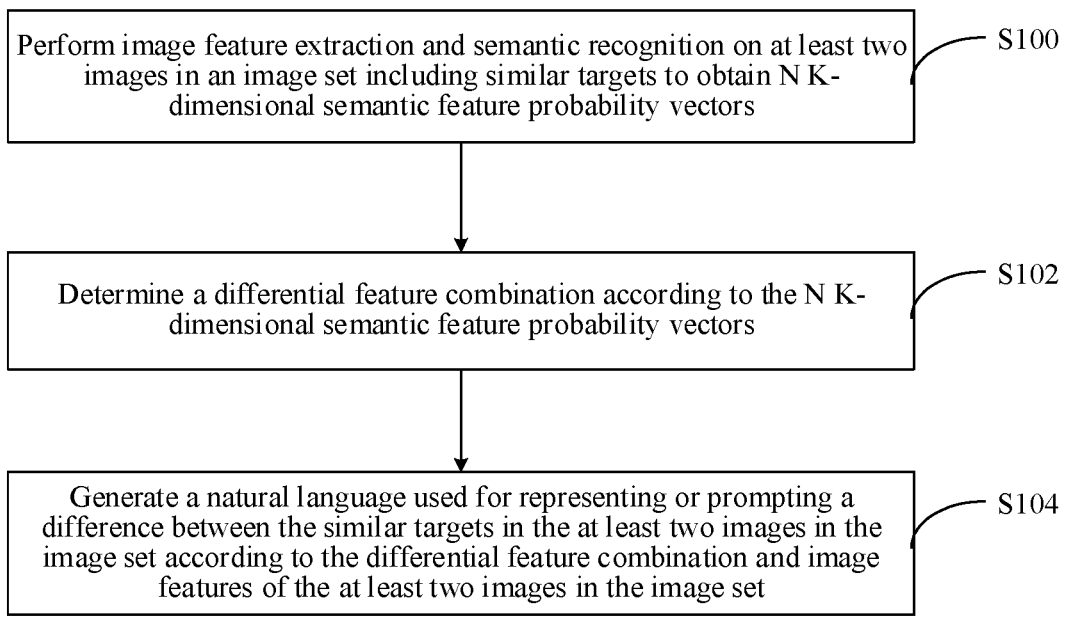
FIG. 1 illustrates a flowchart of one embodiment of an image disambiguation method according to the present disclosure.

Various exemplary embodiments of the present invention are now described in detail with reference to the accompanying drawings. It should be noted that, unless otherwise stated specifically, relative arrangement of the components and operations, the numerical expressions, and the values set forth in the embodiments are not intended to limit the scope of the present invention.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

According to the technical solutions provided in the embodiments of the present disclosure, image feature extraction and semantic recognition are performed on at least two images in an image set including similar targets, and a confidence probability of a semantic feature appearing in the images is output for each semantic feature of the at least two images in the image set to obtain K-dimensional semantic feature probability vectors of the at least two images in the image set. The image set may include two or more images, each image includes K semantic features, and the semantic features may be understood as words or phrases describing a target. Then, a differential feature combination is determined according to the obtained K-dimensional semantic feature probability vectors of the at least two images, the differential feature combination indicating a difference between the similar targets of the at least two images. A natural language is generated according to the differential feature combination and image features of the at least two images in the image set, the natural language being used for representing or prompting the difference between the similar targets in the at least two images in the image set.

According to the embodiments of the present disclosure, firstly, image feature extraction and semantic recognition are performed on at least two images in an image set including similar targets to obtain K-dimensional semantic feature probability vectors of the at least two images, then a differential feature combination indicating an obvious difference between the similar targets in the at least two images is generated according to the K-dimensional semantic feature probability vectors, and then a natural language of the image set is generated according to the differential feature combination and image features of the at least two images, thereby improving the discrimination of similar targets included in different images, enhancing the effect of image disambiguation, and facilitating improvement of the accuracy and efficiency of image/video search.

Referring to FIG. 1, a flowchart of one embodiment of an image disambiguation method according to the present disclosure is shown. The image disambiguation method according to the present embodiment includes the following operations.

In operation S100, image feature extraction and semantic recognition are performed on at least two images in an image set including similar targets to obtain N K-dimensional semantic feature probability vectors.

The image set includes N images, N and K are both positive integers, and N is greater than or equal to 2.

In the present embodiment, the at least two images in the image set including similar targets may be video images consisting of frames of images derived from an image acquisition device, may also be a single frame of image or an image, and may further be derived from other devices. The source and obtaining means of the image set including similar targets may be not limited in the present embodiment.

A target in the present embodiment, for example, may include, but may be not limited to: a person, a vehicle, an animal, a plant, a building, and the like. The specific type of the target may be not limited in the present embodiment.

According to one or more embodiments of the present disclosure, image feature extraction and semantic recognition may be performed by a semantic feature classifier on at least two images in an image set including similar targets to obtain N K-dimensional semantic feature probability vectors. The semantic feature classifier in the present embodiment may be configured to extract image features of the at least two images in the image set, recognize the semantic features of the at least two images in the image set, and output a score for each semantic feature in the at least two images, the score representing a confidence probability of the corresponding semantic feature appearing in the images. In the present embodiment, a semantic feature set may be predefined, and the semantic features may be defined as words or phrases describing a target. For example, the semantic features include a target type (such as "person" and "automobile"), a color (such as "red" and "green"), an action (such as "standing" and "playing tennis"), a position (such as "on the table" and "in the water"), and the like. In the present embodiment, K common semantic features are selected to constitute a semantic feature set. The semantic features recognized by the semantic feature classifier may be semantic features in the semantic feature set.

In an optional example, operation S100 may be performed by a processor by invoking a corresponding instruction stored in a memory, or may be performed by an extraction and recognition module 30 run by the processor.

In operation S102, a differential feature combination is determined according to the N K-dimensional semantic feature probability vectors.

In the present embodiment, the differential feature combination may be used for indicating a difference between the similar targets in the at least two images in the image set, such as a difference in color, a difference in position, or a difference in action, and the like. According to one or more embodiments of the present disclosure, to further improve discrimination of similar targets in different images, a feature combination for an obvious difference between the similar targets in the at least two images in the image set may be as the differential feature combination according to the N K-dimensional semantic feature probability vectors.

In an optional example, operation S102 may be performed by a processor by invoking a corresponding instruction stored in a memory, or may be performed by a determination module 31 run by the processor.

In operation S104, a natural language used for representing or prompting the difference between the similar targets in the at least two images in the image set according to the differential feature combination and image features of the at least two images in the image set.

In the present embodiment, the image features of the at least two images may be obtained by the semantic feature classifier in operation S100, and the image features of the at least two images may also be obtained in other manners, for example, by using an existing convolutional neural network. The specific technical means of obtaining the image features may be not limited in the present embodiment.

According to one or more embodiments of the present disclosure, in operation S104, the differential feature combination and the image features may be input into a pre-trained language model, the language model may integrate input information in two aspects of the differential feature combination and the image features, and a natural language for a difference between the similar targets is output. The natural language may include a "declarative" natural language used for representing the difference between the similar targets; and/or the natural language may include a "questioning" natural language used for expressing the difference between the similar targets in a human-like manner, and a human-machine interaction manner is introduced to image disambiguation, thereby improving the discrimination of the similar targets, thus facilitating improvement of the accuracy and efficiency of image search. For example, if the differential feature combination is {blue, white}, the "questioning" natural language is "what color is this person's shirt". The language model used by the "questioning" natural language may be not limited in the present embodiment.

In an optional example, operation S104 may be performed by a processor by invoking a corresponding instruction stored in a memory, or may be performed by a generation module 32 run by the processor.

According to the technical solution provided in the present embodiment, image feature extraction and semantic recognition are performed on at least two images in an image set including similar targets, and a confidence probability of a semantic feature appearing in the images is output for each semantic feature of the at least two images in the image set to obtain K-dimensional semantic feature probability vectors of the at least two images in the image set. The image set may include two or more images, each image includes K semantic features, and the semantic features may be understood as words or phrases describing a target. Then, a differential feature combination is determined according to the obtained K-dimensional semantic feature probability vectors of the at least two images, the differential feature combination being used for indicating a difference between the similar targets of the at least two images. A natural language is generated according to the differential feature combination and image features of the at least two images in the image set, the natural language being used for representing or prompting the difference between the similar targets in the at least two images in the image set.

According to the present embodiment, first image feature extraction and semantic recognition are performed on at least two images in an image set including similar targets to obtain K-dimensional semantic feature probability vectors of the at least two images, then a differential feature combination used for indicating an obvious difference between the similar targets in the at least two images is generated according to the K-dimensional semantic feature probability vectors, and then a natural language used for representing or prompting the difference between the similar targets in the at least two images in the image set is generated according to the differential feature combination and image features of the at least two images, thereby improving the discrimination of similar targets included in different images, enhancing the effect of image disambiguation, and facilitating the accuracy and efficiency of image/video search.

In the present embodiment, the semantic feature classifier may be pre-trained by means of an image in a public data set Visual Genome and "image area description" annotation information as training data. The training data of the semantic feature classifier may be not limited in the present embodiment. Then image feature extraction and semantic recognition are performed on the at least two images in the image set by means of the trained semantic feature classifier. Image feature extraction and semantic recognition may be performed batchwise on the images in the image set by means of the semantic feature classifier, and the semantic features obtained by semantic recognition are semantic features in a predetermined semantic feature set, so that the semantic features of the at least two images in the image set all belong to a relatively stable semantic feature set.

According to one or more embodiments of the present disclosure, in the present embodiment, a language model based on a neural network may be pre-trained by means of an image in a public data set Visual Genome and "natural language question answering" annotation information as training data, and the natural language output by the language model may be one or a series of "questioning" natural languages. Based on the foregoing annotation information, a training method for the language model based on a neural network may be performed by using an existing neural network training method, such as back propagation and gradient recurrence, and no limitation is made thereto in the embodiments of the present disclosure.

Figure 2:
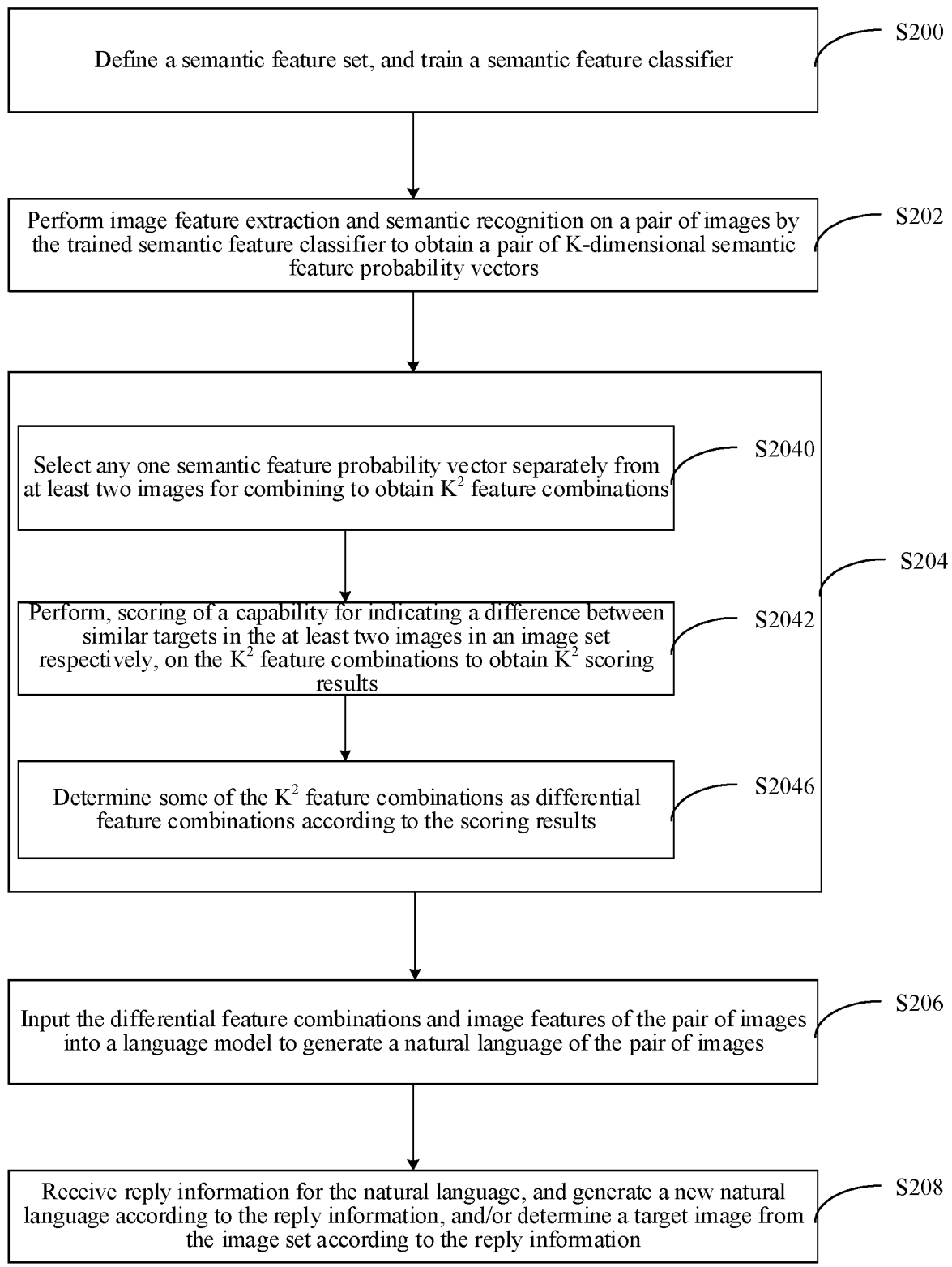
FIG. 2 illustrates a flowchart of another embodiment of an image disambiguation method according to the present disclosure.

Referring to FIG. 2, a flowchart of another embodiment of an image disambiguation method according to the present disclosure is shown. On the basis of the foregoing embodiments, the present embodiment focuses on a difference from the foregoing embodiments. For the same point, reference may be made to the introductions and descriptions in the foregoing embodiments. The present embodiment makes descriptions by taking including a pair of images including similar targets in an image set as an example.

The image disambiguation method according to the present embodiment includes the following operations.

In operation S200, a semantic feature set is defined, and a semantic feature classifier is trained.

In the present embodiment, semantic features may be understood as words or phrases describing a target, for example, a target type (such as "person" and "automobile"), a color (such as "red" and "green"), an action (such as "standing" and "playing tennis"), a position (such as "on the table" and "in the water"), and the like.

The semantic feature classifier in the present embodiment may consist of a deep neural network and a perceptron. In one or more optional implementation, the deep neural network may be a deep convolutional neural network, the perceptron may be a multilayer perceptron, and semantic recognition is performed on the images by means of a large number of parameters carried in each perception layer in the multilayer perceptron, thereby optimizing the effect of semantic recognition. The specific types of the deep neural network and the perceptron may be not limited in the present embodiment. An image in a public data set Visual Genome and "image area description" annotation information may be used as training data of the classifier. The training data and training process of the semantic feature classifier may be not limited in the present embodiment.

In one optional example, operation S200 may be performed by a processor by invoking a corresponding instruction stored in a memory.

In operation S202, image feature extraction and semantic recognition are performed on a pair of images by the trained semantic feature classifier to obtain a pair of K-dimensional semantic feature probability vectors.

Image features of at least two images in an image set are extracted based on the deep neural network; and semantic recognition is performed on the at least two images according to the extracted image features of the at least two images and based on the multilayer perceptron to obtain a pair of K-dimensional semantic feature probability vectors. According to one or more embodiments of the present disclosure, the pair of images is input into the semantic feature classifier, first the pair of images is input into the deep neural network, and the image features of the images are output; and then the image features are input into the multilayer perceptron, and a pair of K-dimensional semantic feature probability vectors is output.

In an optional example, operation S202 may be performed by a processor by invoking a corresponding instruction stored in a memory, or may be performed by an extraction and recognition module 40 run by the processor.

According to one or more embodiments of the present disclosure, before operation S202, search information of an image or a video may be received, and the image or the video is obtained according to the search information.

In one optional example, receiving search information of an image or a video, and obtaining the image or the video according to the search information may be performed by a processor by invoking a corresponding instruction stored in a memory, or may be performed by a search receiving module 45 run by the processor.

According to one or more embodiments of the present disclosure, if the video is obtained, a to-be-disambiguated image may be further determined from the video.

In operation S204, a differential feature combination is determined according to the pair of K-dimensional semantic feature probability vectors.

The differential feature combination in the present embodiment may be one group or multiple groups, the number of differential feature combinations may be determined according to a specific actual application scenario, and no limitation is made thereto in the present embodiment.

In an optional example, operation S204 may be performed by a processor by invoking a corresponding instruction stored in a memory, or may be performed by a determination module 41 run by the processor.

In one or more optional implementations, operation S204 may include the following sub-operations.

In sub-operation S2040, any one semantic feature probability vector is selected separately from the at least two images for combining to obtain $K^2$ feature combinations.

In an optional example, operation S2040 may be performed by a processor by invoking a corresponding instruction stored in a memory, or may be performed by a combination sub-module 410 run by the processor.

In sub-operation S2042, scoring of a capability for indicating the difference between the similar targets in the at least two images in the image set is performed separately on the $K^2$ feature combinations to obtain $K^2$ scoring results.

In an optional example, operation S2042 may be performed by a processor by invoking a corresponding instruction stored in a memory, or may be performed by a scoring sub-module 412 run by the processor.

According to one or more embodiments of the present disclosure, in sub-operation S2042, scoring of a capability for indicating the difference between the similar targets in the at least two images in the image set is performed separately on the $K^2$ feature combinations according to at least one kind of semantic feature information in the $K^2$ feature combinations, where the semantic feature information includes, but is not limited to: a confidence probability of a semantic feature, a type of the semantic feature, and a difference of the semantic feature.

When scoring is performed based on a variety of semantic feature information, merging or weighted merging is performed on scores respectively corresponding to the variety of semantic feature information in a same feature combination in the $K^2$ feature combinations to obtain a scoring result of each feature combination. The scoring merging may use accumulation, multiplication, and the like; and the weighted merging may use average weighting, linear weighting, and the like. The specific technical means of the scoring merging and weighted merging may be not limited in the present embodiment.

The purpose of operation S204 may be selecting one semantic feature separately from at least two images in a pair of images to constitute a differential feature combination used for representing a difference of the pair of images. For example, a person in one image wears a white coat, a person in another image wears a blue coat, and then {white, blue} may be used as one differential feature combination.

K semantic features may exist in each image, and therefore, $K^2$ feature combinations may exist, each feature combination may be one semantic feature pair, each feature combination may be scored by means of a scoring function, and a high score may represent that the feature combination may be suitable for representing an obvious difference of the pair of images. The construction of the scoring function may be determined according to actual requirements. The construction technology of the specific scoring function may be not limited in the embodiments of the present disclosure, for the purpose of selecting, from the $K^2$ feature combinations, a feature combination used for representing the obvious difference of the pair of images.

According to one or more embodiments of the present disclosure, the scoring function in the present embodiment may be constructed based on, but not limited to, at least one of the following three aspects.

a) Confidence Probability Comparison

The confidence probability comparison relates to performing scoring evaluation from the perspective of a difference of a confidence probability score corresponding to different features in a feature combination. The score of the feature combination with a large confidence probability comparison is generally higher the score of the feature combination with a small confidence probability comparison. For example, if in a certain feature combination, there is a relatively high confidence probability for a target in one image, and there is a relatively low confidence probability in a target in another image, and then the score of the feature combination is relatively high; conversely, if in a certain feature combination, the confidence probabilities for two targets are not greatly different, the score of the feature combination is relatively low. From the perspective of only the factor of confidence probability comparison, with respect to the feature combination with a relatively low feature combination, the feature combination with a relatively high feature combination is more suitable for representing the obvious difference of the pair of images.

b) Type Similarity of Semantic Features

The type similarity of semantic features relates to performing scoring evaluation from the perspective of whether the types corresponding to different features in the feature combination belong to the same type. The score of the feature combination with the type of semantic features belonging to the same type is generally higher than the score of the feature combination with the type of semantic features belonging to different types. For example, "blue" and "white" are both semantic features of a color type; "tennis" and "baseball" are both semantic features of a motion type; and "blue" and "tennis" are not semantic features of a same type. If in a certain feature combination, semantic features of two targets do not belong to the same type, the score of the feature combination is relatively low, and if the semantic features of the two targets belong to the same type, the score of the feature combination is relatively high. From the perspective of only the factor of the type similarity of semantic features, with respect to the feature combination with a relatively low score, the feature combination with a relatively high score is more suitable for representing the obvious difference of the pair of images.

c) Easy Discrimination of Semantic Features

The easy discrimination of semantic features relates to performing scoring evaluation on whether it is easy to discriminate visually different features in the feature combination. The score of the feature combination easy to discriminate visually of the semantic features is generally higher than the score of the feature combination difficult to discriminate visually of the semantic features. For example, "blue" and "white" are semantic features easy to discriminate visually; and "tennis racket" and "baseball bat" are semantic features relatively not easy to discriminate visually. If in a certain feature combination, semantic features of two targets are difficult to discriminate visually, the score of the feature combination is relatively low, and if the semantic features of the two targets are easy to discriminate visually, the score of the feature combination is relatively high. From the perspective of only the factor of the easy discrimination of semantic features, with respect to the feature combination with a relatively low score, the feature combination with a relatively high score is more suitable for representing the obvious difference of the pair of images.

In one or more optional implementations, the scoring function in the present embodiment may be represented by using the following formula:

$$s(i,j) = V_i^A(1-V_i^B) \cdot V_j^B(1-V_j^A) \cdot e^{\alpha S_q(i,j)} \cdot e^{-\beta S_f(i,j)}$$

A and B represent two images respectively, and i and j represent two semantic features respectively. The value of S(i, j) represents the scoring of "selecting a semantic feature i for an image A, selecting a semantic feature j for an image B, and combining the semantic feature i and the semantic feature j into a feature combination".

In the embodiment, a) confidence probability comparison: $V_i^A(1-V_i^B) \cdot V_j^B(1-V_j^A)$ as the probability of "the semantic feature i appearing only in the image A, and the semantic feature j appearing only in the image B"; v is the confidence probability output by the semantic feature classifier; $V_i^A$ represents the probability of there being semantic feature i in the image A; $V_i^B$ represents the probability of there being semantic feature i in the image B; $V_j^A$ represents the probability of there being there being semantic feature j in the image A; and $V_j^B$ represents the probability of there being there being semantic feature j in the image B.

b) Type similarity of semantic features: $\alpha$ in $e^{\alpha S_q(i,j)}$ is a parameter capable of adjusting the weight, and $S_q^{(i,j)}$ represents the type similarity of the semantic features i and j.

In the present embodiment, $S_q^{(i,j)}$ may be calculated by means of an image question answering model. The image question answering model is a model combining computer vision and natural language understanding, and answers are made by means of the image question answering model and questions related to image content. The image question answering model in the present embodiment may first encode the input images and questions respectively by using two channels, where an image channel uses a convolutional neural network, and a question channel uses a long short-term memory unit recurrent neural network. Then an answer prediction is used as a classification question, i.e., a correct answer is selected from a candidate answer set as an output. According to one or more embodiments of the present disclosure, fully connected layers are respectively connected after the encoders of the image channel and the question channel as classifiers, all candidate answers are scored, finally the scores of the two channels are added as the most popular score of the candidate answers, and the candidate answer with the highest score is the question answer predicted by the image question answering model.

In the foregoing embodiment, each vector in parameter matrices of the fully connected layers corresponds to one candidate answer in the candidate answer set. The candidate answers with a relatively high similarity, the corresponding vectors thereof are also relatively similar. Thus two candidate answers may be used to correspond to an inner product of vectors to represent the similarity of the two candidate answers. If a parameter vector of a question channel classifier is used, the inner product represents the similarity of the candidate answers with respect to an input question. High similarity represents that the two candidate answers are generally used for answering a same type of questions. That is to say, the two candidate answers are likely to be used as the answer of a same question.

In the training process of the image question answering model, the form of training data is a triad of (image, question, and answer). The "candidate answer set" of the training data is consistent with the "semantic feature set" defined in operation S200.

c) Easy discrimination of semantic features: $e^{-\beta S_f(i,j)}$ is relevant only to the semantic features i and j, and irrelevant to the image A and the image B, and $\beta$ therein is a parameter capable of adjusting the weight. It is desired to give a relatively high score for a semantic feature combination with a low degree of similarity (easy to discriminate), and therefore, a minus sign is added before $S_f^{(i,j)}$.

The calculation mode of $S_f^{(i,j)}$ is similar to the calculation mode of $S_q^{(i,j)}$, but the calculation mode of $S_f^{(i,j)}$ uses the parameter vector of the last fully connected layer of the semantic feature classifier as the representation of the semantic feature, which is different from using the parameter vector of the last fully connected layer of the question channel in the image question answering model used in the calculation mode of $S_q^{(i,j)}$. Reference may be made to the foregoing relevant description about $S_q^{(i,j)}$, and details are not described herein repeatedly.

In sub-operation S2044, some of the $K^2$ feature combinations are determined as the differential feature combination according to scoring results.

According to one or more embodiments of the present disclosure, in sub-operation S2044, the feature combination corresponding to the scoring result with the highest score in the scoring results may be determined as the differential feature combination, and/or one or more feature combinations with a score in the scoring results being higher than a predetermined threshold as the differential feature combination, where the predetermined threshold may be set according to an actual scenario. The specific value of the predetermined threshold may be not limited in the present embodiment.

In an optional example, operation S2044 may be performed by a processor by invoking a corresponding instruction stored in a memory, or may be performed by a determination sub-module 414 run by the processor.

In operation S206, the differential feature combination and image features of the pair of images are input into a language model to generate a natural language of the pair of images.

In the present embodiment, a recurrent neural network with a long short-term memory unit may be used as a language model, and an image in a public data set Visual Genome and "natural language question answering" annotation information as training data of the language model. The training data and training process of the language model may be not limited in the present embodiment. According to one or more embodiments of the present disclosure, in operation S206, the differential feature combination and the image features of the pair of images may be input into the long short-term memory unit recurrent neural network to generate a natural language of the pair of images. In the present embodiment, the generated natural language may be a natural language in the form of questioning, or may be a natural language sequence in the form of questioning.

The natural language in the present embodiment may include at least one natural language in the form of questioning, for example, what color is this person's shirt?

In an optional example, operation S206 may be performed by a processor by invoking a corresponding instruction stored in a memory, or may be performed by a generation module 42 run by the processor.

In operation S208, reply information for the natural language is received, and a new natural language is generated according to the reply information, and/or a target image is determined from an image set according to the reply information.

Following the example above, after "what color is this person's shirt?" is generated, a user answers with "blue". New natural language information "what is the person wearing the blue shirt doing" may further be generated according to the "blue" answered by the user. It should be noted that, the function of the new natural language information is further performing image disambiguation, and the new natural language information may be an extension of previous natural language information, or may have no direct relationship with the previous natural language information.

In operation S208, the new natural language may be generated, a target image may further be generated from an image set according to the reply information, for example, after "what color is this person's shirt?", the user answers with "blue". The image where the person wearing the blue shirt is located may further be determined from the image set in a set form, where the set form may be emphasizing or highlighting, and the set form may be not limited in the present embodiment.

In an optional example, operation S208 may be performed by a processor by invoking a corresponding instruction stored in a memory, or may be performed by a reply receiving module 43 and a reply processing module 44 run by the processor.

According to the technical solution provided in the present embodiment, image feature extraction and semantic recognition are performed by a semantic feature classifier on at least two images in an image set including similar targets, and a confidence probability of a semantic feature appearing in the images is output for each semantic feature of the at least two images in the image set to obtain K-dimensional semantic feature probability vectors of the at least two images in the image set. The image set may include two or more images, each image includes K semantic features, and the semantic features may be understood as words or phrases describing a target. Then, a differential feature combination is determined according to the obtained K-dimensional semantic feature probability vectors of the at least two images, the differential feature combination being used for indicating a difference between the similar targets of the at least two images. The differential feature combination and image features of the at least two images in the image set are input into a language model to generate a natural language, the natural language being used for representing or prompting the difference between the similar targets in the at least two images in the image set.

According to the present embodiment, first image feature extraction and semantic recognition are performed by a semantic feature classifier on at least two images in an image set including similar targets to obtain K-dimensional semantic feature probability vectors of the at least two images, then a differential feature combination used for indicating an obvious difference between the similar targets is generated according to the K-dimensional semantic feature probability vectors of the at least two images, and then the differential feature combination and image features of the at least two images are both input into a language model to generate a natural language of the image set, thereby improving the discrimination of similar targets included in different images, improving the capability of the natural language discriminating the similar targets, enhancing the effect of image disambiguation, and facilitating the accuracy and efficiency of image/video search.

In the present embodiment, the semantic feature classifier may consist of a deep neural network and a multilayer perceptron, the image features of the images are extracted by the deep neural network, the semantic features of the images are recognized by the multilayer perceptron, and then the semantic features of the similar targets are selected and paired to determine obviously different semantic features for indicating the difference between the similar targets. The semantic feature classifier in the present embodiment may perform semantic recognition on the targets on multiple layers in the images by using a multilayer perceptron, thereby broadening the scope of semantic recognition on the targets in the images.

In the present embodiment, semantic recognition may be performed by using a semantic feature classifier, a natural language is generated by using a language model, and independent models are used respectively in the difference analysis process of the similar targets and the generation process of the natural language, so that the functions of the respective models are more explicit and more targeted.

In the present embodiment, semantic feature combinations are scored by using a scoring function, and the factors in three aspects of confidence probability comparison, type similarity of semantic features, and easy discrimination of semantic features are comprehensively considered, so that the differential feature combination determined from multiple semantic feature combinations more accurately expresses the difference between the similar targets.

In the present embodiment, a recurrent neural network with a long short-term memory unit is used as a language model to generate natural language information, and the language model may integrate input information in two aspects of image features and discriminative features, so that the generated language model may accurately describe the difference between the similar targets.

In the present embodiment, a natural language in the form of non-questioning may be generated, or a natural language in the form of questioning may be generated. The generated natural language in the form of questioning can describe the difference between the similar targets in a human-like manner, and may implement man-machine conversation in the image disambiguation process, thereby bringing interaction experience, so that the technical solution in the present embodiment may be applied to a wider actual scenario.

The image disambiguation method according to the present embodiment may be applied to a man-machine interaction system, thereby implementing communication between a machine and human. When the instruction sent by a human to a machine is vague so that the machine is unable to accurately execute the instruction, the machine may generate a natural language in the form of questioning according to the image disambiguation method in the present embodiment, and obtains a clear and accurate instruction again by means of the natural language in the form of questioning.

The image disambiguation method according to the present embodiment may further be applied to an interactive image search scenario, and guides, by generating a natural language in the form of questioning, a user to input a key word or key phrase of image search, thereby improving the efficiency and accuracy of image search.

The image disambiguation method according to the present embodiment may be executed by any appropriate device having an image or data processing capability, for example, including, but not limited to, a camera, a terminal, a mobile terminal, a Personal Computer (PC), a server, a vehicle-mounted device, an entertainment device, an advertisement device, or the like.

Any method provided in the embodiments of the present disclosure may be executed by any appropriate device having a data processing capability, including, but not limited to, a terminal device and a server. Alternatively, any method provided in the embodiments of the present disclosure may be executed by a processor, for example, any method mentioned in the embodiments of the present disclosure is executed by the processor by invoking a corresponding instruction stored in a memory. Details are not described below repeatedly.

A person of ordinary skill in the art may understand that: all or some operations of implementing the forgoing method embodiments may be achieved by a program by instructing related hardware; the foregoing program may be stored in a computer-readable storage medium; and when the program is executed, operations including the foregoing method embodiments are executed. Moreover, the foregoing storage medium includes various media capable of storing program codes such as an ROM, an RAM, a magnetic disk, or an optical disk.

Figure 3:
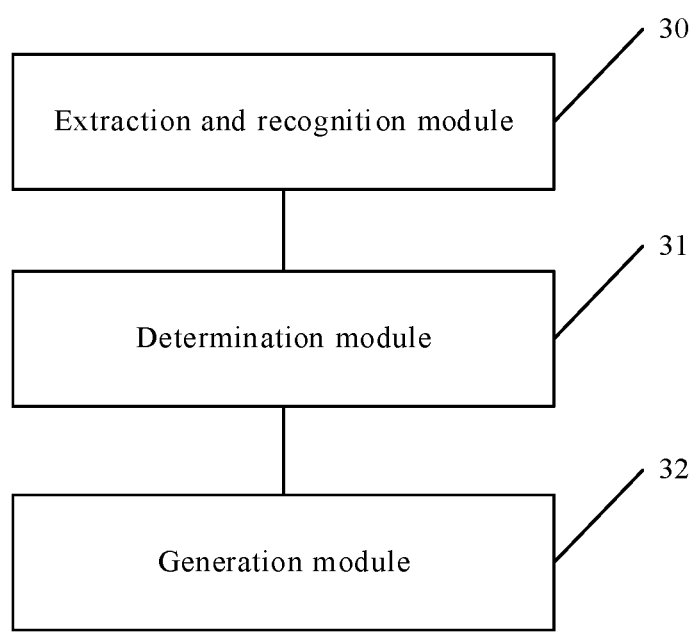
FIG. 3 illustrates a structural block diagram of one embodiment of an image disambiguation apparatus according to the present disclosure.

Referring to FIG. 3, a structural block diagram of one embodiment of an image disambiguation apparatus according to the present disclosure is shown. The image disambiguation apparatus provided in the present embodiment includes:

an extraction and recognition module 30 configured to perform image feature extraction and semantic recognition on at least two images in an image set including similar targets to obtain N K-dimensional semantic feature probability vectors, where the image set includes N images, N and K are both positive integers, and N is greater than or equal to 2; a determination module 31 configured to determine a differential feature combination according to the N K-dimensional semantic feature probability vectors, the differential feature combination being used for indicating a difference between the similar targets in the at least two images in the image set; and a generation module 32 configured to generate a natural language for representing or prompting the difference between the similar targets in the at least two images in the image set according to the differential feature combination and image features of the at least two images in the image set.

According to the technical solution provided in the present embodiment, the extraction and recognition module performs image feature extraction and semantic recognition on at least two images in an image set including similar targets, and outputs a confidence probability of a semantic feature appearing in the images for each semantic feature of the at least two images in the image set to obtain K-dimensional semantic feature probability vectors of the at least two images in the image set. The image set may include two or more images, each image includes K semantic features, and the semantic features may be understood as words or phrases describing a target. Then, the determination module determines a differential feature combination according to the obtained K-dimensional semantic feature probability vectors of the at least two images, the differential feature combination being used for indicating a difference between the similar targets of the at least two images. The generation module 32 generates a natural language according to the differential feature combination and image features of the at least two images in the image set, the natural language being used for representing or prompting the difference between the similar targets in the at least two images in the image set.

According to the present embodiment, first image feature extraction and semantic recognition are performed on at least two images in an image set including similar targets to obtain K-dimensional semantic feature probability vectors of the at least two images, then a differential feature combination used for indicating an obvious difference between the similar targets in the at least two images is generated according to the K-dimensional semantic feature probability vectors, and then a natural language used for representing or prompting the difference between the similar targets in the at least two images in the image set is generated according to the differential feature combination and image features of the at least two images, thereby improving the discrimination of similar targets included in different images, enhancing the effect of image disambiguation, and facilitating the accuracy and efficiency of image/video search.

Figure 4:
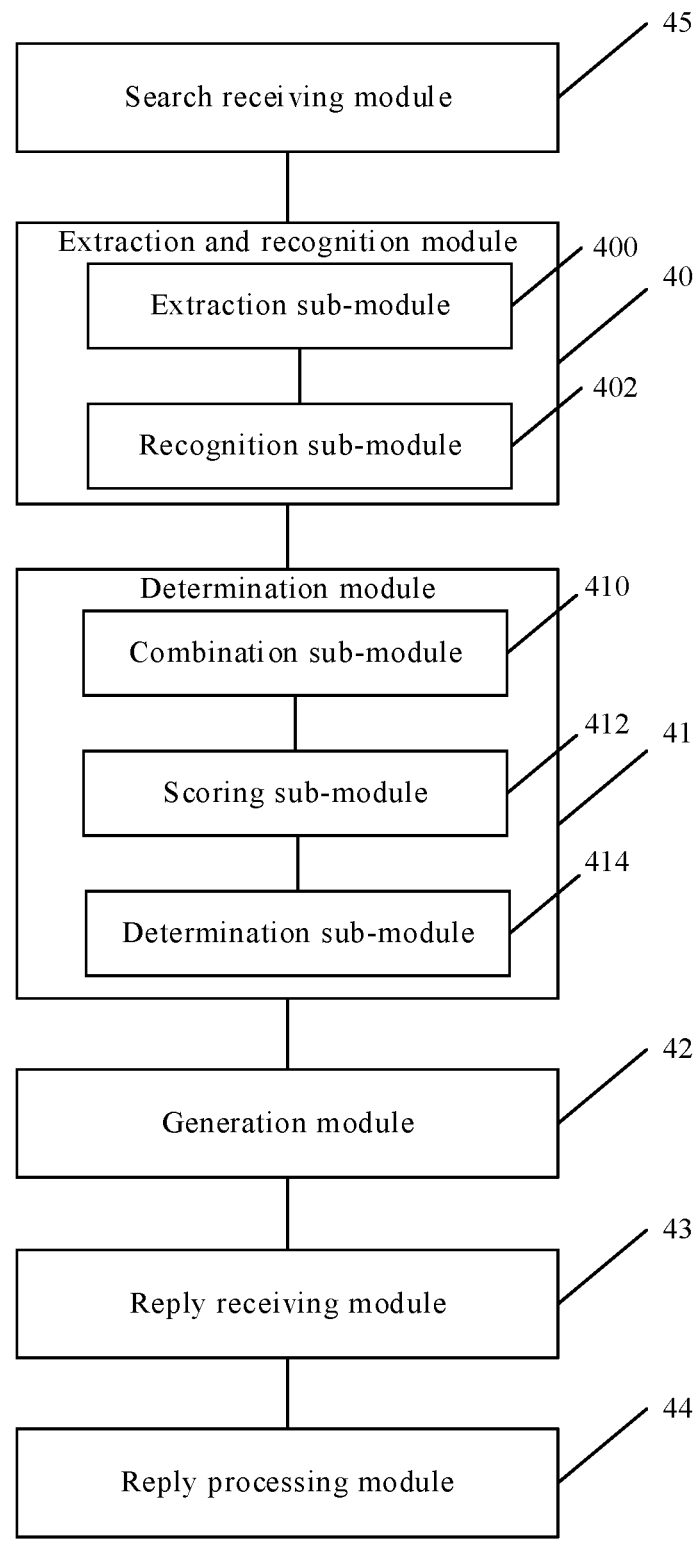
FIG. 4 illustrates a structural block diagram of another embodiment of an image disambiguation apparatus according to the present disclosure.

Referring to FIG. 4, a structural block diagram of another embodiment of an image disambiguation apparatus according to the present disclosure is shown. The image disambiguation apparatus provided in the present embodiment includes:

an extraction and recognition module 40 configured to perform image feature extraction and semantic recognition on at least two images in an image set including similar targets to obtain N K-dimensional semantic feature probability vectors, where the image set includes N images, N and K are both positive integers, and N is greater than or equal to 2; a determination module 41 configured to determine a differential feature combination according to the N K-dimensional semantic feature probability vectors, the differential feature combination being used for indicating a difference between the similar targets in the at least two images in the image set; and a generation module 42 configured to generate a natural language for representing or prompting the difference between the similar targets in the at least two images in the image set according to the differential feature combination and image features of the at least two images in the image set.

According to one or more embodiments of the present disclosure, the natural language may include at least one natural language in the form of questioning.

According to one or more embodiments of the present disclosure, the extraction and recognition module 40 includes: an extraction sub-module 400 configured to extract image features of the at least two images in the image set based on a deep neural network; and a recognition sub-module 402 configured to perform, according to the extracted image features of the at least two images and based on a multilayer perceptron, semantic recognition on the at least two images to obtain the N K-dimensional semantic feature probability vectors.

According to one or more embodiments of the present disclosure, the determination module 41 includes: a combination sub-module 410 configured to select any one semantic feature probability vector separately from the at least two images for combining to obtain $K^N$ feature combinations; and a scoring sub-module 412 configured to perform scoring of a capability for indicating the difference between the similar targets in the at least two images in the image set separately on the $K^N$ feature combinations; and a determination sub-module 414 configured to determine, according to scoring results, some of the $K^N$ feature combinations as the differential feature combinations.

According to one or more embodiments of the present disclosure, the determination sub-module 414 is configured to determine a feature combination with the highest score in the scoring results as the differential feature combination, and/or determine one or more feature combinations with a score in the scoring results being higher than a predetermined threshold as the differential feature combination.

According to one or more embodiments of the present disclosure, the scoring sub-module 412 configured to perform scoring of a capability for indicating the difference between the similar targets in the at least two images in the image set separately on the $K^N$ feature combinations according to at least one kind of semantic feature information in the $K^N$ feature combinations.

According to one or more embodiments of the present disclosure, the scoring sub-module 412 configured to perform scoring of a capability for indicating the difference between the similar targets in the at least two images in the image set separately on the $K^N$ feature combinations according to at least one kind of semantic feature information in a confidence probability of a semantic feature, a type of the semantic feature, and a difference in the semantic feature in the $K^N$ feature combinations.

According to one or more embodiments of the present disclosure, the scoring sub-module 412 is further configured to, in the case that a variety of semantic feature information is based during scoring, perform merging or weighted merging on scores respectively corresponding to the variety of semantic feature information in a same feature combination in the $K^N$ feature combinations to obtain a scoring result of each feature combination.

According to one or more embodiments of the present disclosure, the generation module 42 is configured to perform, according to the differential feature combination and image features of the at least two images in the image set, and based on a long short-term memory unit recurrent neural network, natural language recognition on the at least two images to generate a natural language for representing or prompting the difference between the similar targets in the at least two images in the image set.

According to one or more embodiments of the present disclosure, the image disambiguation apparatus provided in the present embodiment may further include: a reply receiving module 43 configured to, after the generation module 42 generates a natural language for representing or prompting the difference between the similar targets in the at least two images in the image set, receive reply information for the natural language; and a reply processing module 44 configured to generate a new natural language according to the reply information, and/or determine a target image from the image set according to the reply information.

According to one or more embodiments of the present disclosure, the image disambiguation apparatus provided in the present embodiment may further include: a search receiving module 45 configured to, before the extraction and recognition module 40 performs image feature extraction and semantic recognition on at least two images in an image set including similar targets, receive search information of an image or a video.

The image disambiguation apparatus provided in the present embodiment is configured to implement the corresponding image disambiguation method in the foregoing multiple method embodiments, and has the beneficial effects of the corresponding method embodiments. Details are not described herein repeatedly.

In addition, the embodiments of the present disclosure further provide an electronic device, including the image disambiguation apparatus according to any one of the foregoing embodiments of the present disclosure.

Furthermore, the embodiments of the present disclosure further provide another electronic device, including:

a processor and a memory, where the memory is configured to store at least one executable instruction, where the executable instruction causes the processor to execute corresponding operations of the image disambiguation method according to any one of the foregoing embodiments.

The embodiments of the present disclosure further provide an electronic device which, for example, may be a mobile terminal, a PC, a tablet computer, a server, or the like.

Figure 5:
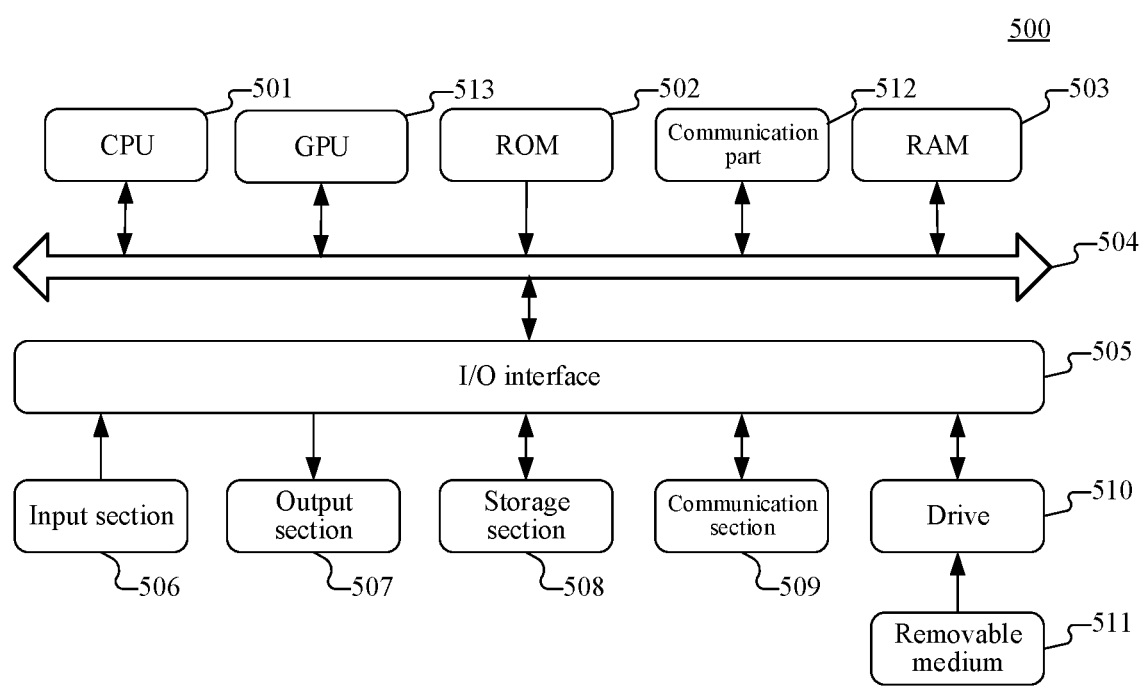
FIG. 5 illustrates a schematic structural diagram of one embodiment of an electronic device according to the present disclosure.

Referring to FIG. 5 below, a schematic structural diagram of an electronic device 500 suitable for implementing the image disambiguation apparatus according to the embodiments of the present disclosure is shown. As shown in FIG. 5, the electronic device 500 includes one or more processors, a communication element, and the like. The one or more processors are, for example, one or more Central Processing Units (CPUs) 501 and/or one or more Graphic Processing Units (GPUs) 513, and the processors may execute various appropriate actions and processing according to executable instructions stored in a Read-Only Memory (ROM) 502 or executable instructions loaded from a storage section 508 to a Random Access Memory (RAM) 503. The communication element includes a communication part 512 and/or a communication section 509. The communication part 512 may include, but may be not limited to, a network card. The network card may include, but may be not limited to, an InfiniBand (TB) network card. The communication section 509 includes a communication section 509 of a network interface card such as an LAN card and a modem, and the communication section 509 performs communication processing via a network such as the Internet.

The processor may communicate with the ROM 502 and/or the RAM 503 to execute executable instructions, is connected to the communication part 512 by means of a communication bus 504, and communicates with other target devices via the communication part 512, so as to complete corresponding operations of any one of the image disambiguation methods provided in the embodiments of the present disclosure, for example, performing image feature extraction and semantic recognition on at least two images in an image set including similar targets to obtain N K-dimensional semantic feature probability vectors, where the image set includes N images, N and K are both positive integers, and N is greater than or equal to 2; determining a differential feature combination according to the N K-dimensional semantic feature probability vectors, the differential feature combination being used for indicating a difference between the similar targets in the at least two images in the image set; and generating a natural language for representing or prompting the difference between the similar targets in the at least two images in the image set according to the differential feature combination and image features of the at least two images in the image set.

Furthermore, in the RAM 503, various programs and data required for operations of the apparatus may further be stored. The CPU 501 or GPU 513, the ROM 502, and the RAM 503 are connected to each other by means of the communication bus 504. In the presence of the RAM 503, the ROM 502 is an optional module. The RAM 503 stores executable instructions, or writes the executable instructions to the ROM 502 during running, where the executable instructions cause the processor to execute corresponding operations of the foregoing communication method. An Input/output (I/O) interface 505 is also connected to the communication bus 504. The communication part 512 may be an integrated, or may be configured to have multiple sub-modules (for example, multiple IB network cards) linked on the communication bus.

The following components are connected to the I/O interface 505: an input section 506 including a keyboard, a mouse, and the like; an output section 507 including a Cathode-Ray Tube (CRT), a Liquid Crystal Display (LCD), a speaker, and the like; a storage section 508 including a hard disk and the like; and a communication section 509 of a network interface card including an LAN card, a modem, and the like. A drive 510 is also connected to the I/O interface 505 according to requirements. A removable medium 511 such as a magnetic disk, an optical disk, a magneto-optical disk, a semiconductor memory or the like is installed on the drive 510 according to requirements, so that a computer program read from the removable medium is installed on the storage section 508 according to requirements.

It should be noted that, the architecture illustrated in FIG. 5 is merely an optional implementation. During practice, the number and types of the components in FIG. 5 may be selected, decreased, increased, or replaced according to actual requirements. Different functional components may be separated or integrated or the like. For example, the GPU 513 and the CPU 501 may be separated, or the GPU 513 may be integrated on the CPU 501, and the communication element may be separated from or integrated on the CPU 501 or the GPU 513 or the like. These alternative implementations all fall within the scope of protection of the present disclosure.

Particularly, the process described above with reference to the flowchart according to the embodiments of the present disclosure is implemented as a computer software program. For example, the embodiments of the present disclosure include a computer program product. The computer program product includes a computer program tangibly included in a machine-readable medium. The computer program includes a program code for executing the method shown in the flowchart. The program code may include corresponding instructions for executing the operations of the method provided in the embodiments of the present disclosure, for example, performing image feature extraction and semantic recognition on at least two images in an image set including similar targets to obtain N K-dimensional semantic feature probability vectors, where the image set includes N images, N and K are both positive integers, and N is greater than or equal to 2; determining a differential feature combination according to the N K-dimensional semantic feature probability vectors, the differential feature combination being used for indicating a difference between the similar targets in the at least two images in the image set; and generating a natural language for representing or prompting the difference between the similar targets in the at least two images in the image set according to the differential feature combination and image features of the at least two images in the image set. In such embodiments, the computer program may be downloaded and installed from a network through the communication element and/or installed from the removable medium 511. When the computer program is executed by the processor, the functions defined in the method according to the embodiments of the present disclosure are executed.

In addition, the embodiments of the present disclosure further provide a computer program, including a computer-readable code, where when the computer-readable code runs in a device, a processor in the device executes instructions for implementing the operations of the image disambiguation method according to any one of the embodiments of the present disclosure.

In addition, the embodiments of the present disclosure further provide a computer storage medium, configured to store computer-readable instructions, where when the instructions are executed, the operations in the image disambiguation method according to any one of the embodiments of the present disclosure are implemented.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing sequence of the operations of the method is merely for description, and unless otherwise stated particularly, is not intended to limit the operations of the method in the present disclosure. Furthermore, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. An image disambiguation method, comprising:
performing image feature extraction and semantic recognition on at least two images in an image set comprising similar targets to obtain N K-dimensional semantic feature probability vectors, wherein the image set comprises N images, N and K are both positive integers, and N is greater than or equal to 2;
determining a differential feature combination according to the N K-dimensional semantic feature probability vectors, wherein the differential feature combination indicates a difference between the similar targets in the at least two images in the image set; and
generating a natural language used for representing or prompting the difference between the similar targets in the at least two images in the image set according to the differential feature combination and image features of the at least two images in the image set.

2. The method according to claim 1, wherein the natural language comprises: at least one natural language in a form of questioning.

3. The method according to claim 1, wherein the performing image feature extraction and semantic recognition on at least two images in an image set comprising similar targets to obtain N K-dimensional semantic feature probability vectors comprises:
extracting image features of the at least two images in the image set based on a deep neural network; and
performing, according to the extracted image features of the at least two images and based on a multilayer perceptron, semantic recognition on the at least two images to obtain the N K-dimensional semantic feature probability vectors.

4. The method according to claim 1, wherein the determining a differential feature combination according to the N K-dimensional semantic feature probability vectors comprises:
selecting any one semantic feature probability vector respectively from the at least two images for combining to obtain $K^N$ feature combinations;
performing, scoring of a capability for indicating the difference between the similar targets in the at least two images in the image set, respectively on the $K^N$ feature combinations; and
determining, according to scoring results, part feature combinations of the $K^N$ feature combinations as the differential feature combinations.

5. The method according to claim 4, wherein the determining, according to scoring results, part feature combinations of the $K^N$ feature combinations as the differential feature combinations comprises at least one of the following operations:
determining a feature combination with a highest score in the scoring results as the differential feature combination, or
determining one or more feature combinations with a score in the scoring results being higher than a predetermined threshold as the differential feature combination.

6. The method according to claim 4, wherein the performing, scoring of a capability for indicating the difference between the similar targets in the at least two images in the image set, respectively on the $K^N$ feature combinations comprises:
performing, the scoring of the capability for indicating the difference between the similar targets in the at least two images in the image set, respectively on the $K^N$ feature combinations according to at least one kind of semantic feature information in the $K^N$ feature combinations.

7. The method according to claim 6, wherein the performing, the scoring of the capability for indicating the difference between the similar targets in the at least two images in the image set, respectively on the $K^N$ feature combinations according to at least one kind of semantic feature information in the $K^N$ feature combinations comprises:
performing, the scoring of the capability for indicating the difference between the similar targets in the at least two images in the image set, respectively on the $K^N$ feature combinations according to at least one kind of semantic feature information in a confidence probability of a semantic feature, a type of the semantic feature, and a difference of the semantic feature in the $K^N$ feature combinations.

8. The method according to claim 6, wherein in a case that multiple kinds of semantic feature information is based during scoring, the performing, the scoring of the capability for indicating the difference between the similar targets in the at least two images in the image set, respectively on the $K^N$ feature combinations further comprises:
performing merging or weighted merging on scores respectively corresponding to the multiple kinds of semantic feature information in a same feature combination in the $K^N$ feature combinations to obtain a scoring result of each feature combination.

9. The method according to claim 1, wherein the generating a natural language used for representing or prompting the difference between the similar targets in the at least two images in the image set according to the differential feature combination and image features of the at least two images in the image set comprises:
performing, according to the differential feature combination and the image features of the at least two images in the image set, and based on a long short-term memory unit recurrent neural network, natural language recognition on the at least two images;
generating a natural language used for representing or prompting the difference between the similar targets in the at least two images in the image set.

10. The method according to claim 1, wherein after generating a natural language used for representing or prompting the difference between the similar targets in the at least two images in the image set, the method further comprises:
receiving reply information for the natural language; and
at least one of the following operations:
generating a new natural language according to the reply information, or
determining a target image from the image set according to the reply information.

11. The method according to claim 1, before performing image feature extraction and semantic recognition on at least two images in an image set comprising similar targets, further comprising:
receiving search information of an image or a video.

12. An electronic device, comprising:
a processor; and
a memory for storing instructions executable by the processor;
wherein execution of the instructions by the processor causes the processor to perform:
performing image feature extraction and semantic recognition on at least two images in an image set comprising similar targets to obtain N K-dimensional semantic feature probability vectors, wherein the image set comprises N images, N and K are both positive integers, and N is greater than or equal to 2;
determining a differential feature combination according to the N K-dimensional semantic feature probability vectors, wherein the differential feature combination indicates a difference between the similar targets in the at least two images in the image set; and
generating a natural language used for representing or prompting the difference between the similar targets in the at least two images in the image set according to the differential feature combination and image features of the at least two images in the image set.

13. The electronic device according to claim 12, wherein the natural language comprises: at least one natural language in the form of questioning.

14. The electronic device according to claim 12, wherein the performing image feature extraction and semantic recognition on at least two images in an image set comprising similar targets to obtain N K-dimensional semantic feature probability vectors comprises:
extracting image features of the at least two images in the image set based on a deep neural network; and
performing, according to the extracted image features of the at least two images and based on a multilayer perceptron, semantic recognition on the at least two images to obtain the N K-dimensional semantic feature probability vectors.

15. The electronic device according to claim 12, wherein the determining a differential feature combination according to the N K-dimensional semantic feature probability vectors comprises:
selecting any one semantic feature probability vector respectively from the at least two images for combining to obtain $K^N$ feature combinations;
performing, scoring of a capability for indicating the difference between the similar targets in the at least two images in the image set, respectively on the $K^N$ feature combinations; and
determining, according to scoring results, part feature combinations of the $K^N$ feature combinations as the differential feature combinations;
wherein the determining, according to scoring results, part feature combinations of the $K^N$ feature combinations as the differential feature combinations comprises at least one of the following operations:
determining a feature combination with a highest score in the scoring results as the differential feature combination, or
determining one or more feature combinations with a score in the scoring results being higher than a predetermined threshold as the differential feature combination;
wherein the performing, scoring of a capability for indicating the difference between the similar targets in the at least two images in the image set, respectively on the $K^N$ feature combinations comprises:
performing, the scoring of the capability for indicating the difference between the similar targets in the at least two images in the image set, respectively on the $K^N$ feature combinations according to at least one kind of semantic feature information in the $K^N$ feature combinations.

16. The electronic device according to claim 15, wherein the performing, the scoring of the capability for indicating the difference between the similar targets in the at least two images in the image set, respectively on the $K^N$ feature combinations according to at least one kind of semantic feature information in the $K^N$ feature combinations comprises:
performing, the scoring of the capability for indicating the difference between the similar targets in the at least two images in the image set, respectively on the $K^N$ feature combinations according to at least one kind of semantic feature information in a confidence probability of a semantic feature, a type of the semantic feature, and a difference of the semantic feature in the $K^N$ feature combinations.

17. The electronic device according to claim 15, wherein in a case that multiple kinds of semantic feature information is based during scoring, the performing, the scoring of the capability for indicating the difference between the similar targets in the at least two images in the image set, respectively on the $K^N$ feature combinations further comprises:
performing merging or weighted merging on scores respectively corresponding to the multiple kinds of semantic feature information in a same feature combination in the $K^N$ feature combinations to obtain a scoring result of each feature combination.

18. The electronic device according to claim 12, wherein the generating a natural language used for representing or prompting the difference between the similar targets in the at least two images in the image set according to the differential feature combination and image features of the at least two images in the image set comprises:
performing, according to the differential feature combination and the image features of the at least two images in the image set, and based on a long short-term memory unit recurrent neural network, natural language recognition on the at least two images;
generating a natural language used for representing or prompting the difference between the similar targets in the at least two images in the image set.

19. The electronic device according to claim 12, wherein after generating a natural language used for representing or prompting the difference between the similar targets in the at least two images in the image set, the processor is further caused to perform:

receiving reply information for the natural language; and
        at least one of the following operations:
    generating a new natural language according to the reply information, or
        determining a target image from the image set according to the reply information.

20. A non-transitory computer-readable storage medium configured to store computer-readable instructions, wherein execution of the instructions by the processor causes the processor to perform:

performing image feature extraction and semantic recognition on at least two images in an image set comprising similar targets to obtain N K-dimensional semantic feature probability vectors, wherein the image set comprises N images, N and K are both positive integers, and N is greater than or equal to 2;
    determining a differential feature combination according to the N K-dimensional semantic feature probability vectors, wherein the differential feature combination indicates a difference between the similar targets in the at least two images in the image set; and
    generating a natural language used for representing or prompting the difference between the similar targets in the at least two images in the image set according to the differential feature combination and image features of the at least two images in the image set.

\* \* \* \* \*